United States Patent [19]

Meng

[11] Patent Number: 5,273,465
[45] Date of Patent: Dec. 28, 1993

[54] MAGNETOHYDRODYNAMIC BOUNDARY LAYER CONTROL SYSTEM

[75] Inventor: James C. S. Meng, Portsmouth, R.I.

[73] Assignee: The United States of America as represented by the Secretary of the Navy, Washington, D.C.

[21] Appl. No.: 16,325

[22] Filed: Feb. 11, 1993

[51] Int. Cl.⁵ ............................................. B60L 11/02
[52] U.S. Cl. .......................................... 440/6; 114/337
[58] Field of Search ....................... 60/202, 203.1, 204, 60/221; 244/204, 205, 230; 440/6, 38; 114/20

[56] References Cited

U.S. PATENT DOCUMENTS 2,737,145  3/1956  Gentile ..................................... 440/6
3,106,058  10/1963  Rice ........................................ 60/202

FOREIGN PATENT DOCUMENTS 2217117  10/1989  United Kingdom ................... 440/6

*Primary Examiner*—Edwin L. Swinehart
*Attorney, Agent, or Firm*—Michael J. McGowan; Prithvi C. Lall; Michael F. Oglo

[57] ABSTRACT

An active boundary layer control system for marine vehicles is disclosed. The boundary layer control system comprises a plurality of magnets and seawater electrodes placed in circumferential rows around the beam of the hull. The magnets and electrodes are positioned so that a Lorentz force generated by the interacting magnetic and electric fields will drive the boundary layer flow in an axial direction toward the aft end of the hull. The boundary control system reduces turbulence and may relaminarize boundary layer flow, thereby reducing radiated noise.

4 Claims, 3 Drawing Sheets

MAGNETOHYDRODYNAMIC BOUNDARY LAYER CONTROL SYSTEM

STATEMENT OF GOVERNMENT INTEREST

The invention described herein may be manufactured and used by or for the Government of the United States of America for Governmental purposes without the payment of any royalties thereon or therefor.

CROSS REFERENCES TO RELATED PATENT APPLICATIONS

The instant application is related to my four co-pending U.S. Patent Applications entitled SUPERCONDUCTING ELECTROMAGNETIC TORPEDO LAUNCHER U.S. application Ser. No. 016,349; SUPERCONDUCTING ELECTROMAGNETIC THRUSTER U.S. application Ser. No. 016,324; SEAWATER MAGNETOHYDRODYNAMIC TEST APPARATUS U.S. application Ser. No. 016,328; and ACTIVE TURBULENCE CONTROL USING MICROELECTRODES, PERMANENT MAGNETS IN MICROGROOVES U.S. application Ser. No. 016,326 having same filing date as this application.

BACKGROUND OF THE INVENTION (1) Field of the Invention

The invention relates to boundary layer control systems and more particularly to active turbulent boundary layer control using magnetohydrodynamic technology.

(2) Description of Prior Art

It is well known in the art that control of turbulence and vorticity in the boundary layer flow around a marine hull reduces both drag and radiated noise. Additionally, loaded surfaces, such as diving planes and rudders, or thrusting surfaces such as propellers or screws, can operate at higher performance coefficients when boundary layer control systems are used. Various types of active boundary layer control systems have been designed using: heating the hull skin; injecting the micro bubbles; high strain-rate polymers; suction for drawing off inner boundary layer flow; or injection of high velocity flow along the inner boundary layer. The first three types are based on modifying the fluid properties of flow in the turbulent boundary layer. The fourth type of boundary layer control, commonly referred to as suction boundary layer control, depends on drawing off the low speed flow in the boundary layer near the body of a vehicle so that the natural turbulence prediction cycle will be disrupted. The last type is blowing boundary layer control in which an energized stream is injected into the boundary layer, accelerating the inner flow lines thereby reducing vorticity and turbulence.

Each of these systems has had limited success. The weight, volume and power penalties of active boundary layer control systems have made them impractical in many applications. Additionally, energy supply, storage of polymer, injection gas and ducting for active systems creates maintenance and reliability problems and, in the case of combat damage, additional vulnerabilities.

SUMMARY OF THE INVENTION

Accordingly, it is an object of the present invention to provide an active boundary layer control system which is lightweight, operates with low input power, and occupies little physical space. It is a further object of the invention to provide a boundary layer control system which is robust and can be operated in a damaged condition without creating a hazard to the vehicle. It is yet another object of the invention to provide a magnetohydrodynamic (MHD) boundary layer control system for marine vehicles which provides a force directly on the water adjacent to the vehicle hull to provide flow separation control.

The invention is a boundary layer control system using magnetic and electric fields interaction to provide a driving force to energize boundary layer flow around a marine vehicle.

A plurality of magnets are located circumferentially around the hull. Seawater electrodes are placed between each of the magnets and between the poles of each magnet. The resulting interaction of the electric and magnetic fields produces a Lorentz force which reduces the turbulence and may even relaminarize the flow in the boundary layer.

DESCRIPTION OF THE PREFERRED EMBODIMENT

Figure 1:
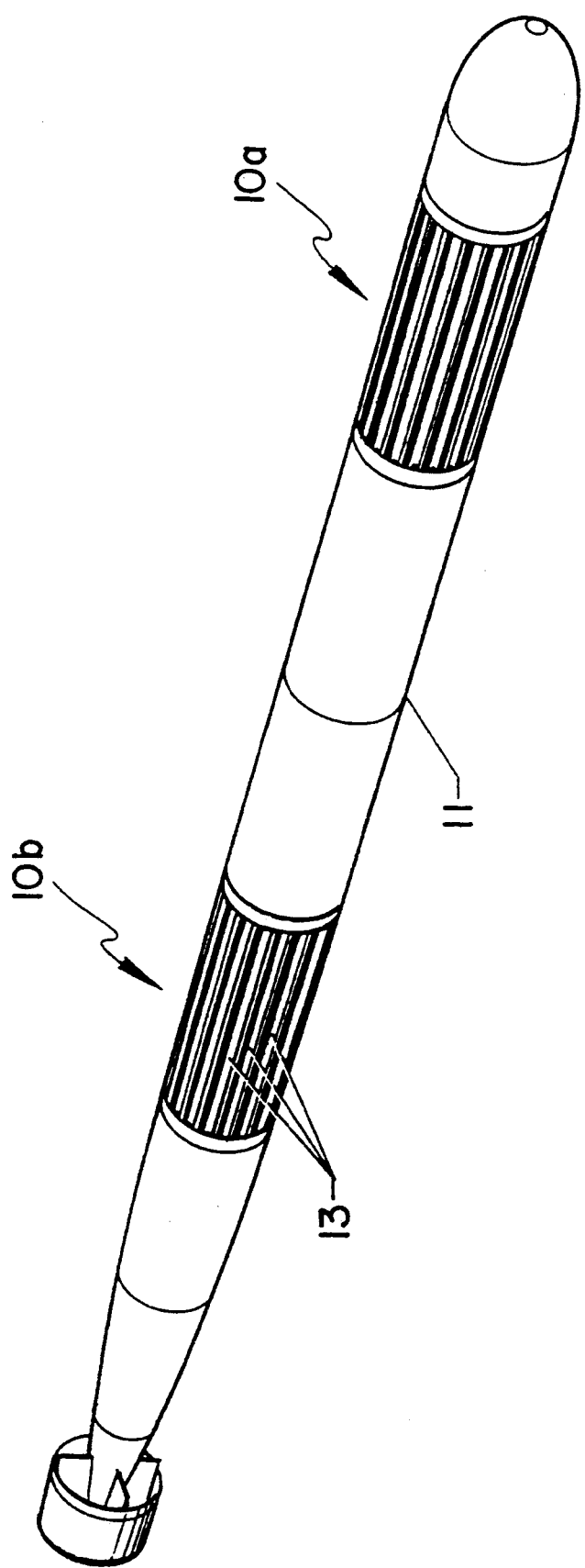
FIG. 1 is a perspective view showing the MHD boundary layer system installed on a torpedo.

Referring now to FIG. 1, the active boundary layer control (active BLC) system, made up of a plurality of bands denoted generally by the reference numerals 10a and 10b, is shown installed on torpedo 11. Band 10a of the active BLC system provides turbulence reduction and possibly relaminarization of the flow along the forward portions of the torpedo 11. As the flow continues along the body of torpedo 11, turbulence and vorticity begin to increase. Band 10b then reduces the turbulence and may relaminarize the flow providing a boundary layer control along the downstream portions of the torpedo body. Each band is made up of a plurality of magnets 13 aligned axially on torpedo 11, and forming a circumferential band around the torpedo. High current electrodes are collocated with the magnets in each band.

Figure 2:
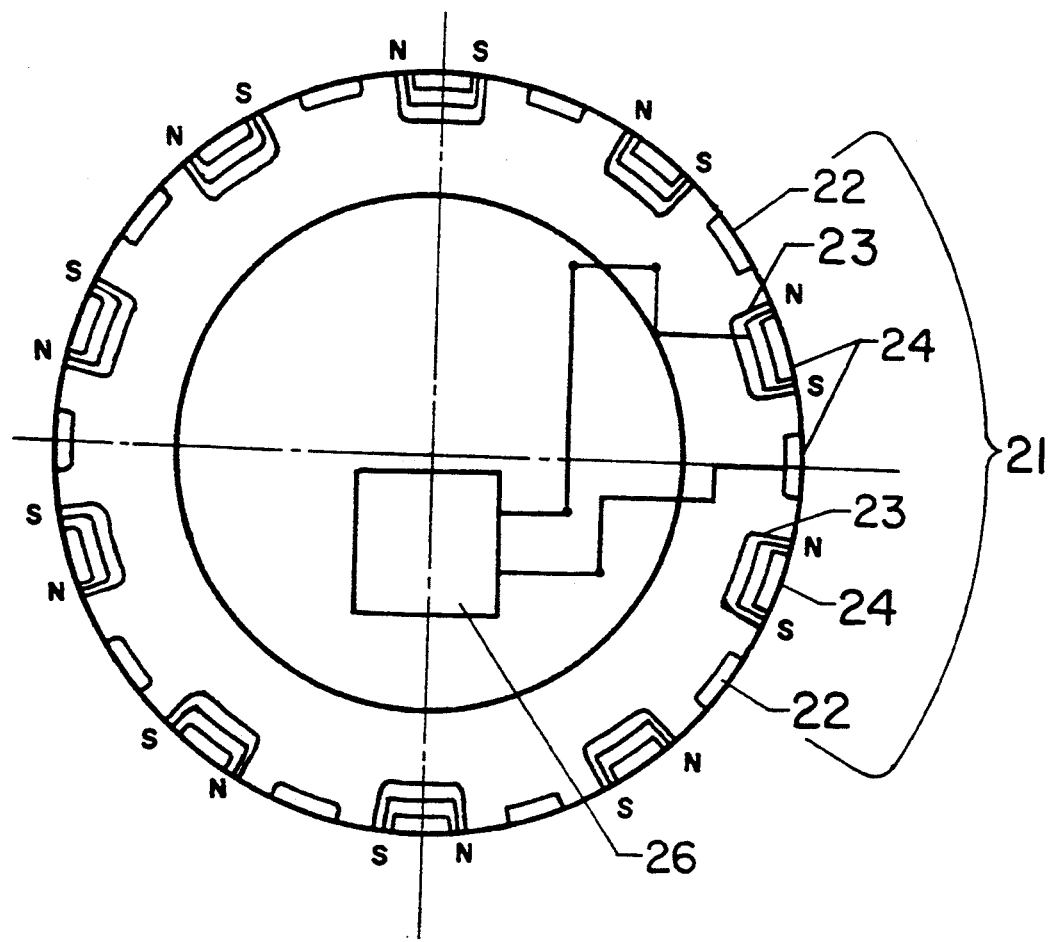
FIG. 2 is a cross section of a marine vehicle hull showing the MHD active boundary layer control system.
Figure 3:
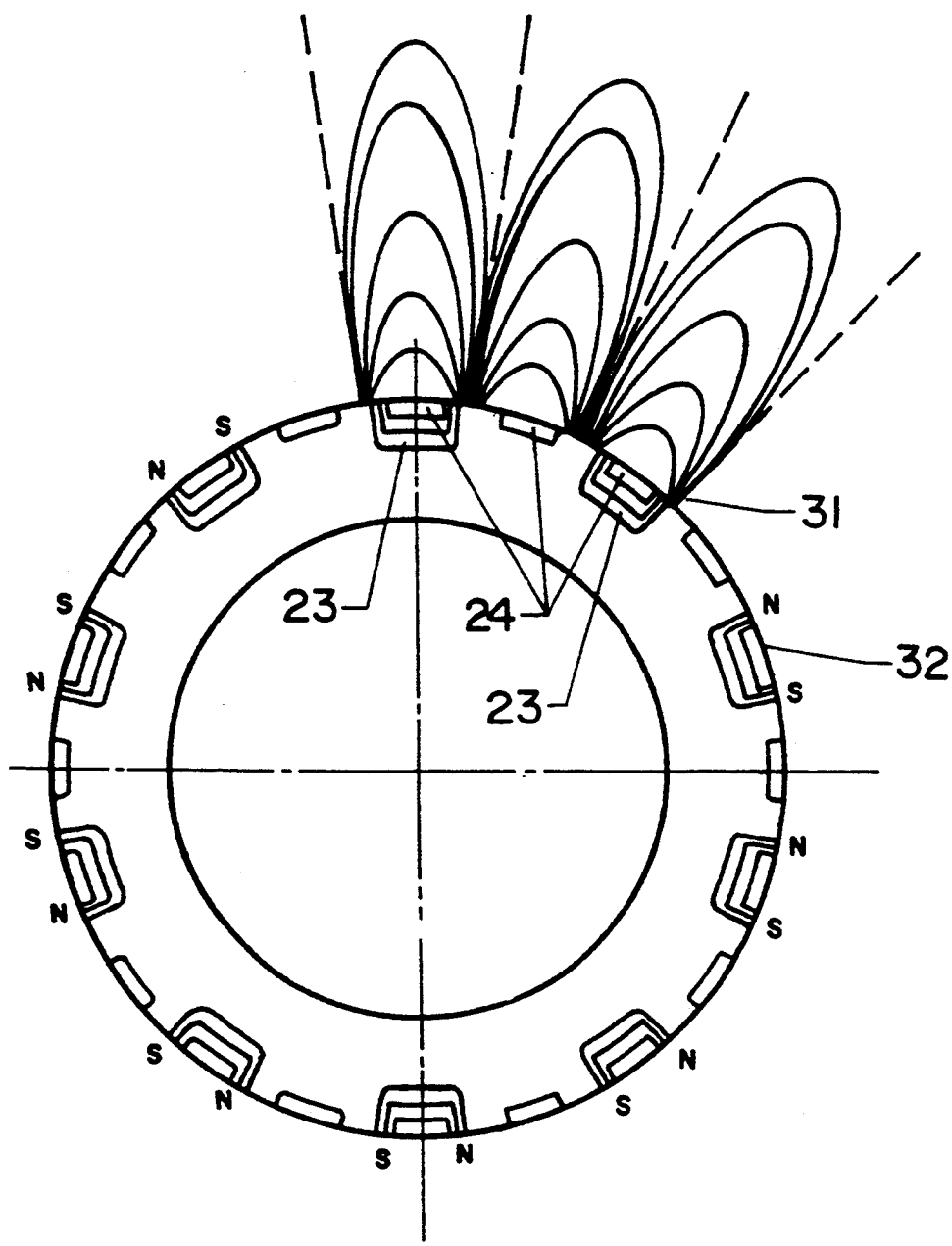
FIG. 3 is a cross-section of a marine vehicle hull showing the interaction of the magnetic and electric fields of the invention.

FIG. 2 is a cross-section through torpedo 11 showing the magnet and electrode layout. Each north and south pole of each magnet is identified by the letter "N" or "S". The circumference of the hull is divided into arc segments each having a pair of magnets and associated electrodes. Segment 21 includes a non-conducting hull section 22 which separates pairs of magnets 23. Electrodes 24 are positioned between the magnet pairs and in the centers of the magnets between the poles. Block 26 represents a conventional battery pack used to power electrodes 24 in the embodiment using permanent magnets. Due to the relatively low MHD Lorentz force required to control the boundary layer, superconducting magnets are not required and therefore, permanent magnets can be used to set up the magnetic field. The resulting electric and magnetic fields may be seen in FIG. 3. The magnetic field 31 initially forms magnetic flux lines extending radially outward from the hull 32. Electrodes 24, positioned between magnets 23, provide an electric current flow circumferentially around hull 32 in a line connecting the electrodes. The resulting fields set up perpendicular intersecting vectors, the electric field parallel to the surface of the hull and the magnetic field perpendicular to the surface of the hull.

This interaction of fields provides a Lorentz force acting on the seawater boundary layer driving the seawater rearward along the hull. The effect is to impose a Lorentz force on the boundary layer flow, which reduces the turbulence production and may relaminarize the flow beyond the normal Reynolds number limits.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An active boundary layer control system for marine vehicles comprising:

a non-conducting vehicle hull;

a plurality of permanent magnet pairs affixed to said hull forming first and second circumferential bands, the first band being located in the forward one quarter of the length of said hull and the second band being located in the rearward half of the length of the hull;

a plurality of seawater electrodes positioned adjacent to said plurality of magnet pairs and oriented on said hull, to produce a circumferential electrical field; and an electrical power system providing direct current to said seawater electrodes.

2. An active boundary layer control system as in claim 1 wherein said non-conducting vehicle hull comprises a torpedo body constructed of dielectric composite material.

3. An active boundary layer control system as in claim 1 wherein said non-conducting vehicle hull comprises a metal hull having an electrically insulating coating over the exterior surface.

4. An active boundary layer control system as in claim 1 wherein said electrical system comprises a battery.

* * * * *